(12) United States Patent
Saylor et al.

(10) Patent No.: US 11,633,777 B2
(45) Date of Patent: Apr. 25, 2023

(54) MANUFACTURING METHODS FOR WHEEL RIM, SPOKE AND STEEL WHEEL AND STEEL WHEEL FORMED BY METHODS

(71) Applicant: Zhejiang Jingu Co., Ltd., Zhejiang (CN)

(72) Inventors: David Saylor, Zhejiang (CN); Xiaofei Ni, Zhejiang (CN); Haizhou Yuan, Zhejiang (CN); Xiaodi Chen, Zhejiang (CN); Xiangyong Jin, Zhejiang (CN); Dongdong Xiong, Zhejiang (CN); Kang Wang, Zhejiang (CN)

(73) Assignee: Zhejiang Jingu Co., Ltd., Zhejiang (CN)

( * ) Notice: Subject to any disclaimer, the term of this patent is extended or adjusted under 35 U.S.C. 154(b) by 349 days.

(21) Appl. No.: 16/499,277

(22) PCT Filed: Apr. 10, 2018

(86) PCT No.: PCT/CN2018/082474
§ 371 (c)(1),
(2) Date: Sep. 29, 2019

(87) PCT Pub. No.: WO2018/188580
PCT Pub. Date: Oct. 18, 2018

(65) Prior Publication Data
US 2021/0107051 A1    Apr. 15, 2021

(30) Foreign Application Priority Data
Apr. 12, 2017    (CN) .......................... 201710237795.1

(51) Int. Cl.
*B21D 53/30*    (2006.01)
*B21D 22/02*    (2006.01)

(52) U.S. Cl.
CPC ........... *B21D 53/30* (2013.01); *B21D 22/022* (2013.01)

(58) Field of Classification Search
CPC ......................... B21D 22/022; B21D 53/30; B60B 2310/206; B60B 2310/228;
(Continued)

(56) References Cited

U.S. PATENT DOCUMENTS 5,577,810 A    11/1996    Abe et al.
2007/0157470 A1    7/2007    Murray

FOREIGN PATENT DOCUMENTS

CN    2915566 Y    6/2007
CN    101434020 A    5/2009
(Continued)

OTHER PUBLICATIONS

Machine Translation for CN 104551552A (Year: 2015).*
(Continued)

*Primary Examiner* — David P Bryant
*Assistant Examiner* — Christine Bersabal
(74) *Attorney, Agent, or Firm* — Gang Yu

(57) ABSTRACT

Some embodiments of the present disclosure provide manufacturing methods for a wheel rim, a spoke and a steel wheel and a steel wheel formed by the methods. The methods includes that: a wheel rim/a spoke blank is heated in a heating furnace, and the heated wheel rim/the heated spoke blank is transferred onto a hot press. A temperature of the wheel rim/the spoke blank being required to be kept above a required temperature in a process of transferring the heated wheel rim/the heated spoke blank to the hot press. Then the wheel rim/the spoke blank is formed in the hot press. A formed wheel rim and a formed spoke are connected to product a steel wheel.

3 Claims, 21 Drawing Sheets

(58) Field of Classification Search
CPC .......... B60B 2360/10; B60B 2360/102; B60B 2900/111; B60B 2900/112; B60B 3/10; B60B 3/04; B60B 21/00; B23P 15/00; B21K 1/28; B21K 1/32; B21K 1/38
See application file for complete search history.

(56) References Cited

FOREIGN PATENT DOCUMENTS

| | | | |
|---|---|---|---|
| CN | 101722401 A | | 6/2010 |
| CN | 202518032 U | | 11/2012 |
| CN | 104551552 A | * | 4/2015 |
| CN | 104551552 A | | 4/2015 |
| CN | 104551553 A | | 4/2015 |
| CN | 104589910 A | | 5/2015 |
| CN | 106102953 A | | 11/2016 |
| CN | 106363353 A | | 2/2017 |
| CN | 106378397 A | | 2/2017 |
| CN | 205996023 U | | 3/2017 |
| CN | 107052720 A | | 8/2017 |
| DE | 10058806 A | | 6/2002 |
| JP | 2016117079 A | | 6/2016 |
| RU | 2570254 C2 | | 4/2015 |
| RU | 2607882 C1 | | 1/2017 |

OTHER PUBLICATIONS

Machine Translation of CN-205996023-U (Year: 2017).*
Machine Translation of CN-106378397-A (Year: 2017).*
Corresponding RU Office Action search results with English translation.

* cited by examiner

MANUFACTURING METHODS FOR WHEEL RIM, SPOKE AND STEEL WHEEL AND STEEL WHEEL FORMED BY METHODS

RELATED APPLICATIONS

The present application is a national phase entry under 35 U.S.C. § 371 of International Patent Application No. PCT/CN2018/082474, filed Apr. 10, 2018, entitled "Manufacturing methods for Wheel Rim, spoke, steel wheel and steel wheel formed by methods", which claims priority to Chinese Patent Application No. 201710237795.1, filed on Apr. 12, 2017 and entitled, both of which are incorporated herein by reference in their entirety.

TECHNICAL FIELD

The disclosure relates to a wheel and a manufacturing method thereof, and particularly to a steel wheel formed by hot stamping and a manufacturing method thereof.

BACKGROUND

A conventional method for manufacturing a steel wheel has the problems of dimensional instability, an early failure of durability, weight larger than that of a wheel manufactured from another metal alloy (for example, aluminum) and the like. Although an aluminum alloy wheel is lighter, its production cost is much higher than that of the steel wheel. The conventional method for producing the steel wheel includes various metal forming processes, and an acting force is applied to a material in the forming processes to harden a metal. The conventional method also includes a connecting process of heating a local region of the steel wheel, but poor mechanical performance may be brought. Poor mechanical performance may cause an early failure of the steel wheel. For solving these above problems, a heat treatment may be performed on the steel wheel by the conventional method or an element manufactured by the conventional method to eliminate undesirable characteristics. A known heat treatment method related to a conventional steel wheel manufacturing method is a time-consuming and high-cost method. Therefore, there is a need for a steel wheel manufacturing method capable of ensuring dimensional stability of a product and durability of the product, the steel wheel produced by the method is lighter than the steel wheel produced by the conventional method, and the dimensional stability and durability of the product may also be ensured. Moreover, there is also another need for the steel wheel manufacturing method more effective and lower in cost than the conventional method.

SUMMARY

Some embodiments of the disclosure provide a wheel formed by hot stamping and a manufacturing method. Not only are weight smaller than that of a steel wheel produced by a conventional method, higher effectiveness and lower cost achieved but also dimensional stability and durability of a product may be ensured. The technical problems in a prior art that a heat treatment method is time-consuming and high in cost and a produced wheel is easy to fail are solved.

The technical problems are solved in the disclosure through following technical solutions. In an exemplary embodiment, a manufacturing method for a wheel rim of a steel wheel includes following steps: a round tubular object is heated in a heating furnace, and the heated round tubular object is transferred onto a hot press, a temperature of the round tubular object transferred onto the hot press being required to be kept above an expected temperature and the required temperature being at least above 950° C.; and then the round tubular object is formed by use of an internal contour to achieve a purpose of producing the wheel rim. The wheel rim manufactured by the method may be combined with a wheel spoke to produce a wheel mentioned in the disclosure.

In an exemplary embodiment, time for transferring the round tubular object heated in the heating furnace from the heating furnace to the hot press should be controlled to be 12 seconds and even less.

In an exemplary embodiment, after the wheel rim is placed on the hot press, a device with multiple nozzles and capable of spraying water or a coolant in a crossing manner is adopted to uniformly spray water or another coolant to a surface, on which a tire is mounted, of the formed wheel rim. The method further includes that the wheel rim is placed in an acid washing tank adopting an organic acid to remove pollutants on the wheel rim.

In an exemplary embodiment, a method for manufacturing a spoke of a steel wheel includes that: a variable section thickness spoke blank is prepared, and the blank is heated in a heating furnace, time for transferring the heated spoke blank from the heating furnace onto a hot press being required not to exceed 12 seconds, a temperature of the spoke blank transferred into the hot press being required to be higher than a required temperature and the temperature required by the spoke being at least 950° C.; and the spoke blank is cooled and formed by use of a mold with a cooling function on the hot press to form the wheel spoke. The method further includes that the spoke is placed in an acid washing tank adopting an organic acid to remove pollutants on the spoke. The wheel spoke may be connected with the wheel rim, thereby producing one wheel.

In an exemplary embodiment, the step that the variable section thickness spoke blank is prepared includes that: a reinforcing ring is concentrically positioned above a spoke substrate, and an outer side edge of the reinforcing ring is welded on the spoke substrate, and a depth of a welding seam formed by the welding is 12-15 mm. The step further includes that the spoke substrate is spun by use of a hard roll forming mold to reduce a thickness of a region of the outer side edge of the spoke substrate.

The reinforcing ring is welded on the spoke substrate to manufacture one variable thickness spoke blank. The variable thickness spoke blank refers to that a middle region of the blank is a relatively thick portion and an outer side periphery of the blank is a relatively thin portion.

Therefore, the wheel formed by hot stamping and the manufacturing method of some embodiments of the disclosure have the following advantages.

The steel wheel manufactured by the manufacturing method of some embodiments of the disclosure or the steel wheel provided in the embodiments have the advantages of improving durability and prolonging service life. The weight of the steel wheel in the embodiment is also remarkably smaller than that of the steel wheel produced by the conventional method. Moreover, compared with the conventional method, the manufacturing method of the embodiment is lower in cost and more effective.

BRIEF DESCRIPTION OF THE DRAWINGS

The specification drawings forming a part of the disclosure are adopted to provide a further understanding to the disclosure. Schematic embodiments of the disclosure and descriptions thereof are adopted to explain the disclosure and not intended to form improper limits to the disclosure. In the drawings:

FIG. 13b is a side view of FIG. 13a;

DETAILED DESCRIPTION OF THE EMBODIMENTS

The technical solutions of the disclosure will further specifically be described below in combination with the drawings through embodiments.

Embodiments

Figure 1:
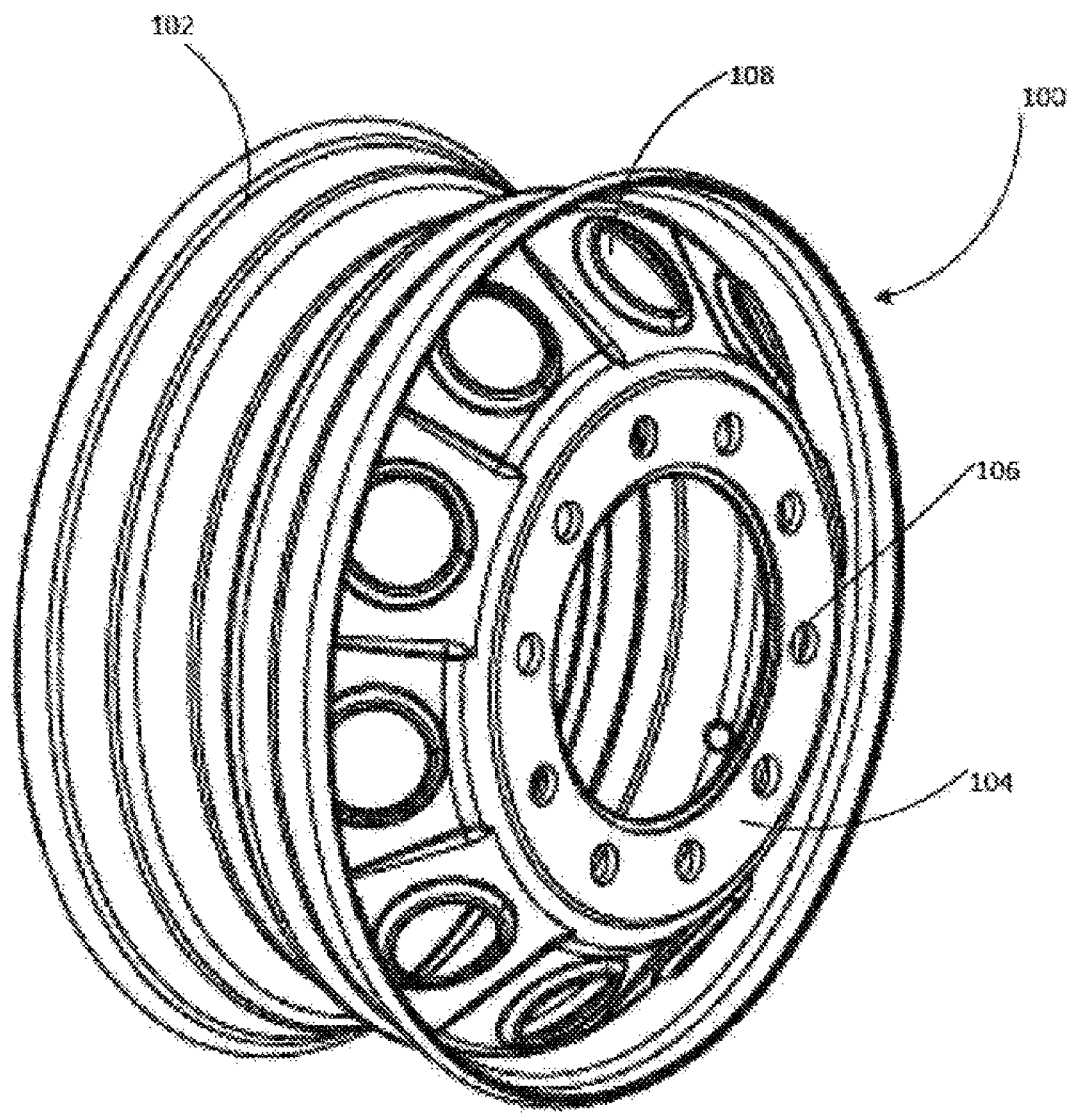
FIG. 1 is a schematic diagram of a wheel according to an embodiment of the disclosure.

FIG. 1 illustrates a wheel manufactured by a method of an embodiment of the disclosure. Components of the wheel 100 include a wheel rim 102 and a spoke 104. The wheel 100 further includes mounting holes 106, and the wheel 100 is mounted on a vehicle for use by the mounting holes 106. The wheel 100 may further include one or more air holes 108. As mentioned above, the spoke 104 may have different thicknesses, a central portion of the spoke 104 close to the mounting holes 106 is relatively thick, and an outer side peripheral portion of the spoke 104 is relatively thin. A steel wheel with certain durability and a remarkably reduced weight is produced by use of a material, a structure and a hot stamping forming method. For example, in the embodiments of the disclosure, a weight of a steel wheel of which a product specification is 22.5×8.25 cm is only about 21.5 kg. A weight of a steel wheel, produced by a conventional manufacturing method, of the same specification is about 31 kg. The weight of a forged aluminum alloy wheel is similar to the weight of the steel wheel manufactured by the method of the disclosure, but cost of the forged aluminum alloy wheel may be remarkably increased.

Figure 2:
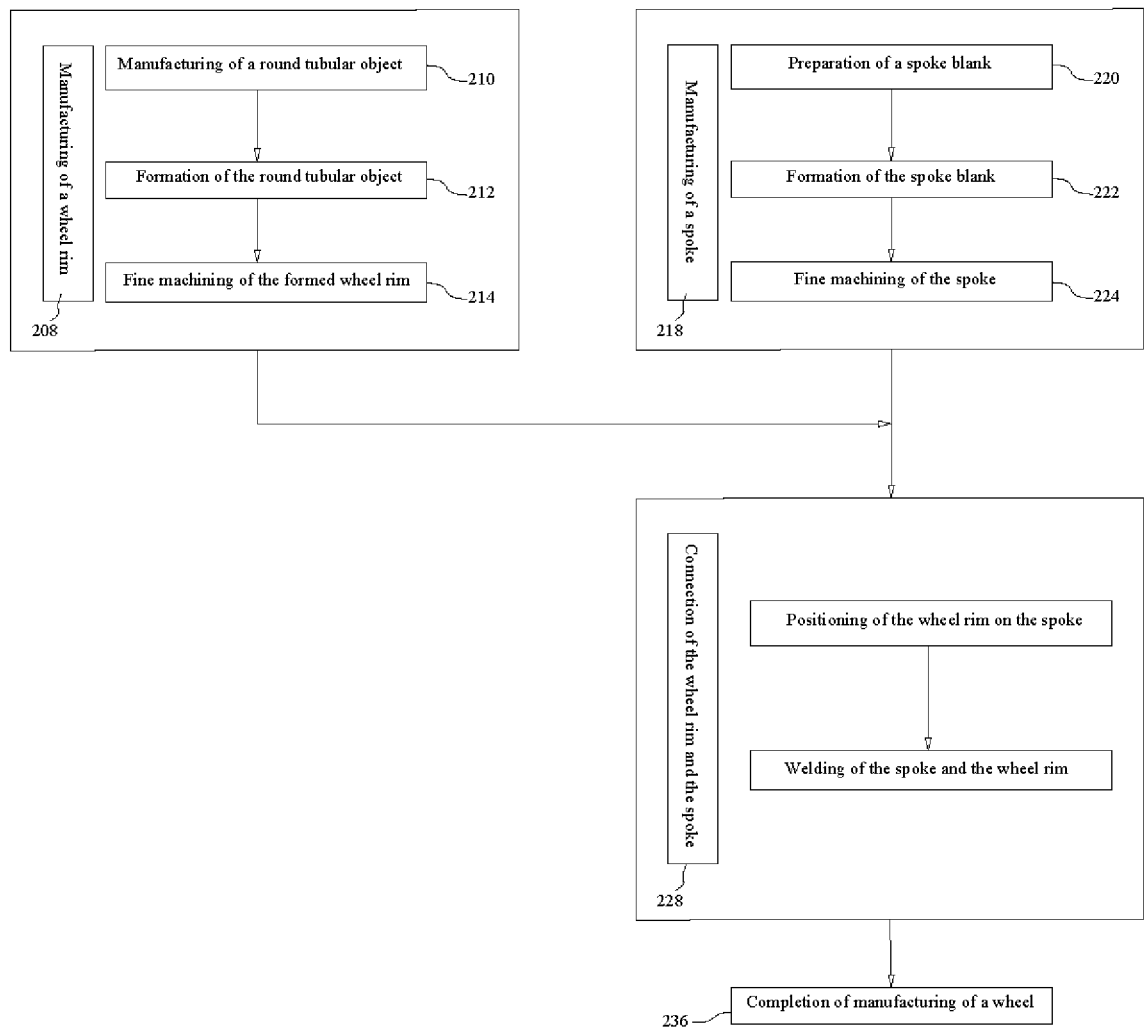
FIG. 2 is a schematic diagram of an exemplary process of manufacturing a wheel according to an embodiment of the disclosure.

The wheel and related manufacturing methods will be described below. Related steps of the wheel manufacturing method of the disclosure include manufacturing of the wheel rim, manufacturing of the spoke and connection of the spoke and the wheel rim. Manufacturing of the wheel rim further includes multiple manufacturing stages. FIG. 2 is an exemplary flow chart of the wheel manufacturing method.

The manufacturing method described herein is suitable for manufacturing of the steel wheel. A preferred material for manufacturing the wheel rim 102 and the spoke 104 is boron steel. Boron steel is particularly suitable for the wheel of some embodiments of the disclosure because of its mechanical performance, particularly hardenability meeting forming. Chemical components of the boron steel which may be used in the embodiments refer to Table 1 and material performance refers to Table 2.

TABLE 1

| | Chemical Components | | | | | | |
|---|---|---|---|---|---|---|---|
| Class | C | Si | Mn | P | S | Al | B |
| WHF1300R WHF1300D | ≤0.28 | ≤0.50 | ≤1.70 | ≤0.025 | ≤0.010 | ≤0.035 | ≤0.008 |

TABLE 2

| | Material Performance | | | |
|---|---|---|---|---|
| Class | Thickness (mm) | Yield strength (MPa) | Tensile strength (MPa) | Elongation (%) |
| WHF1300R | 3.0-6.0 | ≤400 | ≤520 | ≥18 |
| WHF1300D | 3.0-6.0 | ≤540 | ≤650 | ≥15 |

Figure 3:
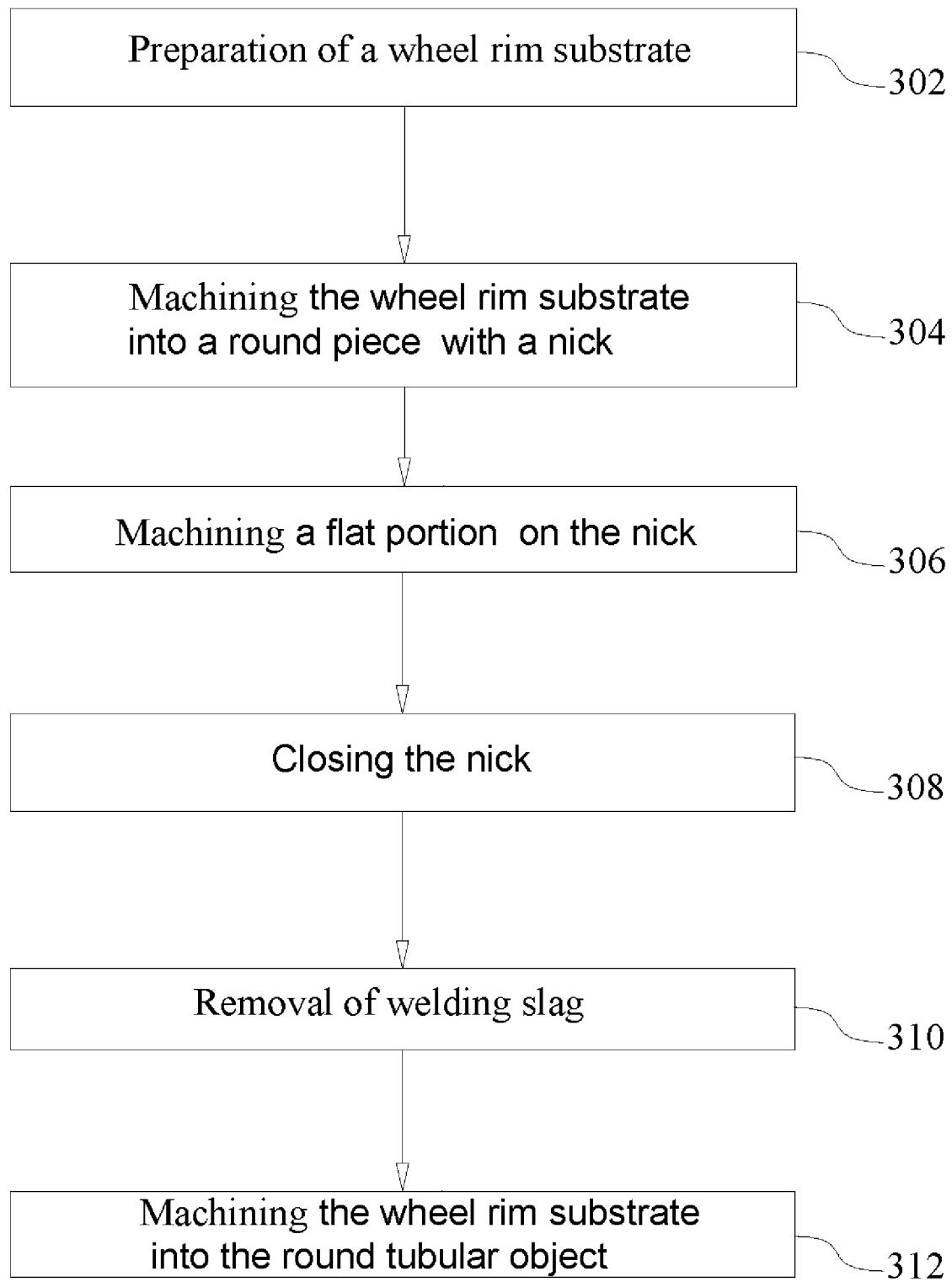
FIG. 3 is a schematic diagram of an exemplary process of manufacturing a round tubular object according to an embodiment of the disclosure.

As shown in an exemplary method of FIG. 2, a manufacturing process for the wheel rim 102 (Step 208 in FIG. 2) Includes the following processes: Step 210: a round tubular object is manufactured, Step 212: the round tubular object is machined into a preliminarily formed wheel rim, and Step 214: fine machining of the formed wheel rim. FIG. 3 is an exemplary process of manufacturing the round tubular object. As shown in the figure, the exemplary process includes the following steps: Step 302: a wheel rim substrate is prepared, Step 304: the wheel rim substrate is machined into a round piece with a nick, Step 306: a flat portion is machined on the nick, Step 308: the nick is closed, Step 310: welding slag is removed, Step 312: the wheel rim substrate is machined into the round tubular object. By the steps, the wheel rim substrate can be machined into the round tubular object for further machining into the wheel in an embodiment of the disclosure.

The exemplary process of manufacturing the round tubular object is shown in FIG. 3 to FIG. 8, and is started with Step 302 of preparing the wheel rim substrate. The wheel rim substrate 402 is a rectangular steel plate or another alloy suitable for machining the wheel. Such a rectangular blank is different from a wheel rim blank for conventional production, and a length of the rectangular blank is about 0.4%-0.5% smaller than that of another blank. This short blank is required for adaptation to density reduction by 0.4%-0.5% during martensitic transformation of steel in a hot forming process. Expansion of the wheel rim may provide slight plastic deformation for the wheel rim, and then the wheel rim may become round till a final dimension. As a coincidence, an expansion quantity of the wheel is about 0.5%. Therefore, if regulation of reducing the length of the rectangular blank is not performed before transformation, the wheel rim may not reach a correct final dimension. In Step 302, the wheel rim substrate 402 may be impregnated in an acid washing solution or kept in oil to keep its characteristics and achieve optimal quality of a subsequent forming and connecting process (which will further be described), thereby producing a firm and durable wheel.

Figure 4:
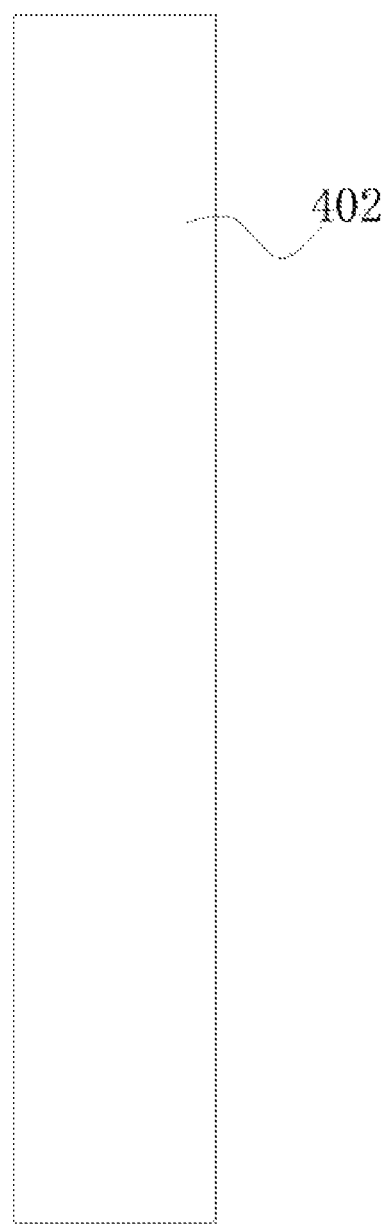
FIG. 4 is a schematic diagram of a wheel rim substrate according to an embodiment of the disclosure.
Figure 5:
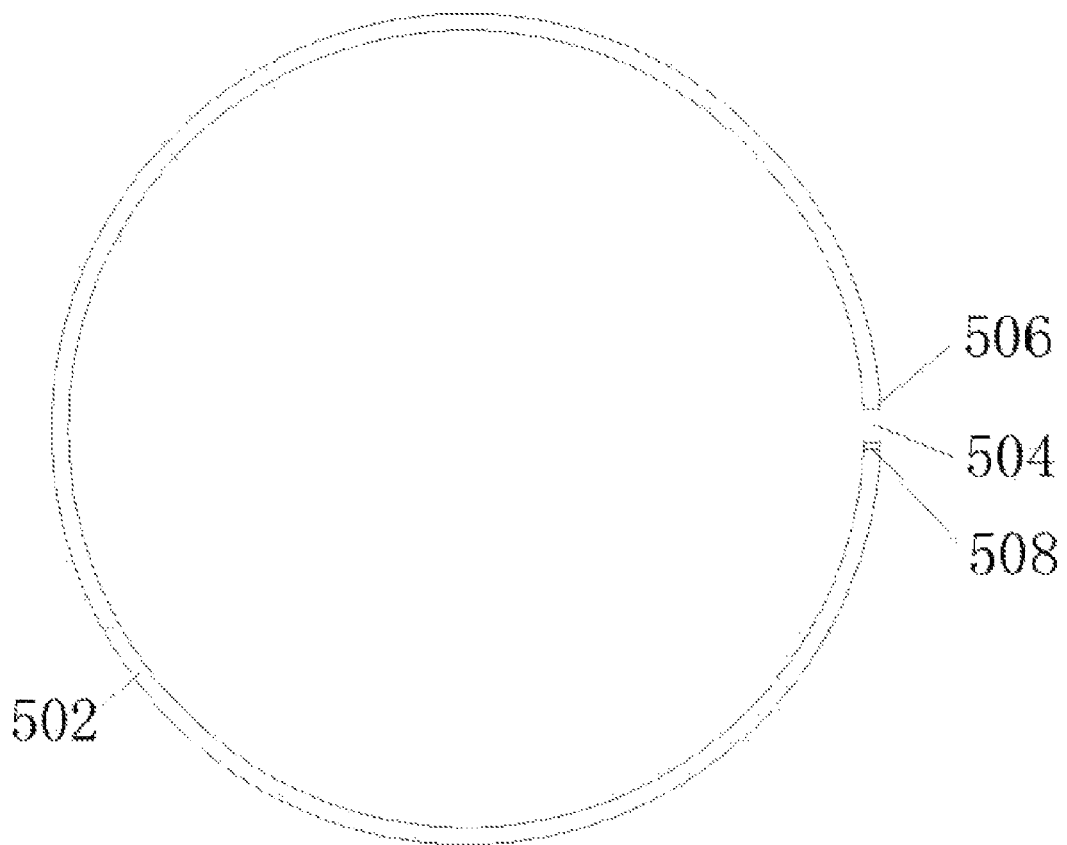
FIG. 5 is a schematic diagram of a round piece according to an embodiment of the disclosure.

As shown in FIGS. 4 and 5, the wheel rim substrate 402 is formed and machined into a round piece 502 in Step 304. Under a normal condition, the round piece 502 is a round of which a radial dimension is far smaller than the final radial dimension of the wheel 100 in terms of shape. The wheel rim substrate 402 may be delivered into a rolling machine or another suitable machining method is adopted to roll the rectangular wheel rim substrate 402 into the round piece 502. As shown in FIG. 5, the round piece 502 is substantially a round canister with the nick 504, and the nick 504 is disposed between a first end 506 of the round piece 502 and a second end 508 of the round piece 502. The nick 504 has such characteristics that the round piece 502 may close the nick 504 and then the first end 506 and the second end 508 may meet each other and be jointed in Step 308.

Figure 6:
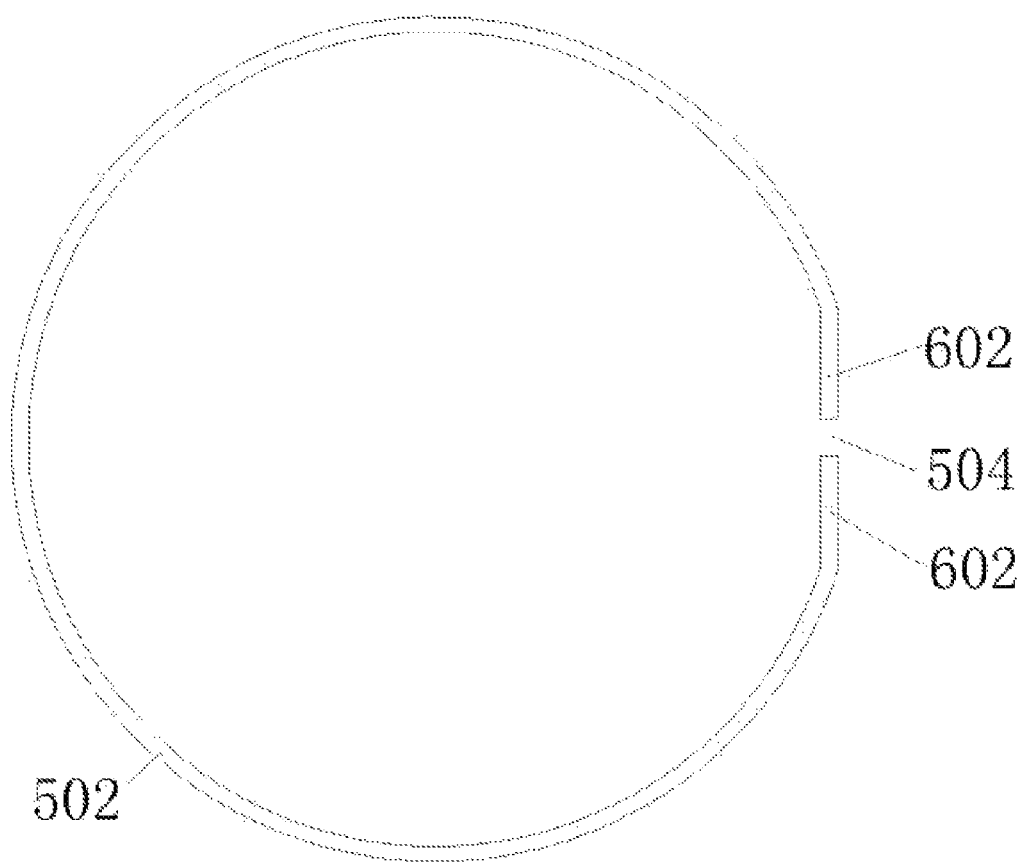
FIG. 6 is a schematic diagram of a round piece with a flat portion according to an embodiment of the disclosure.

Before the nick 504 is closed, for ensuring higher simplicity and higher quality of the subsequent process, a part of region of the round piece 502 may be flattened in Step 306. As shown in FIG. 6, the round piece 502 with the flat portion 602 may be manufactured by proper pressure on a flattening mold. The flat portion 602 extends by a certain distance above the first end 506 and below the second end 508.

Figure 7:
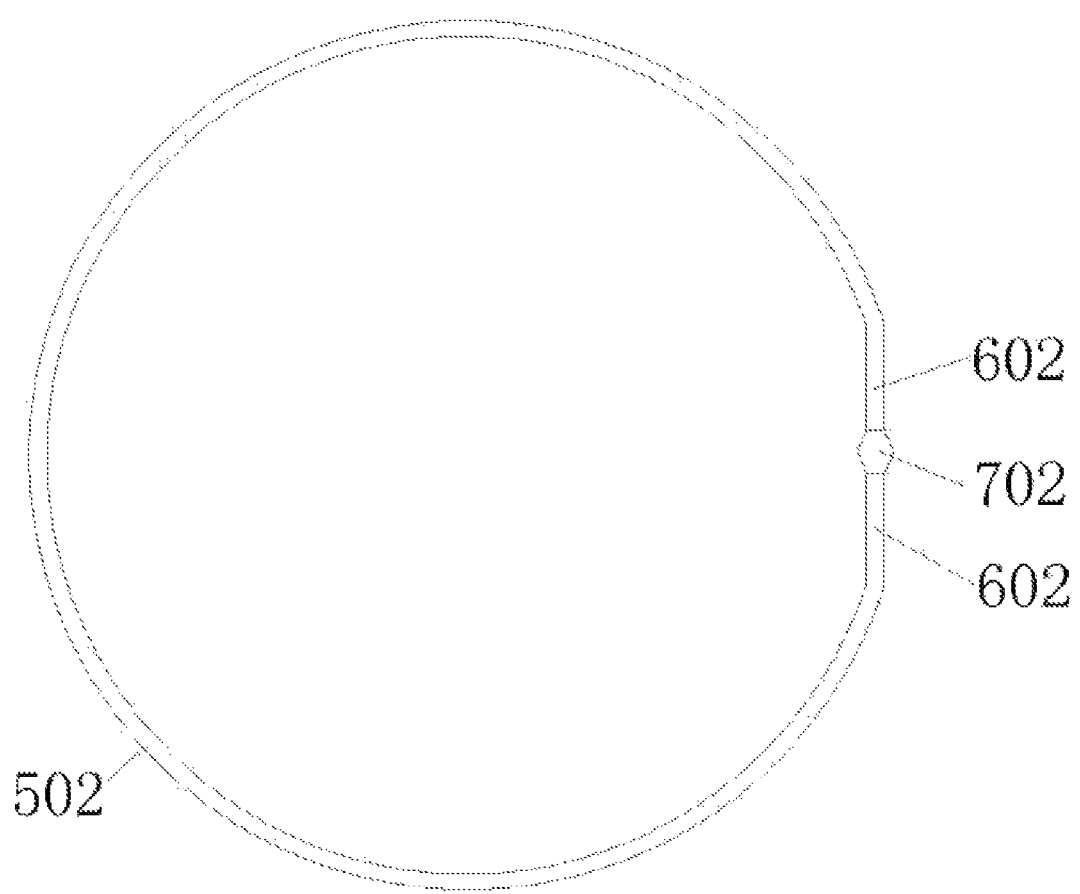
FIG. 7 is a schematic diagram of a closed round piece according to an embodiment of the disclosure.
Figure 8:
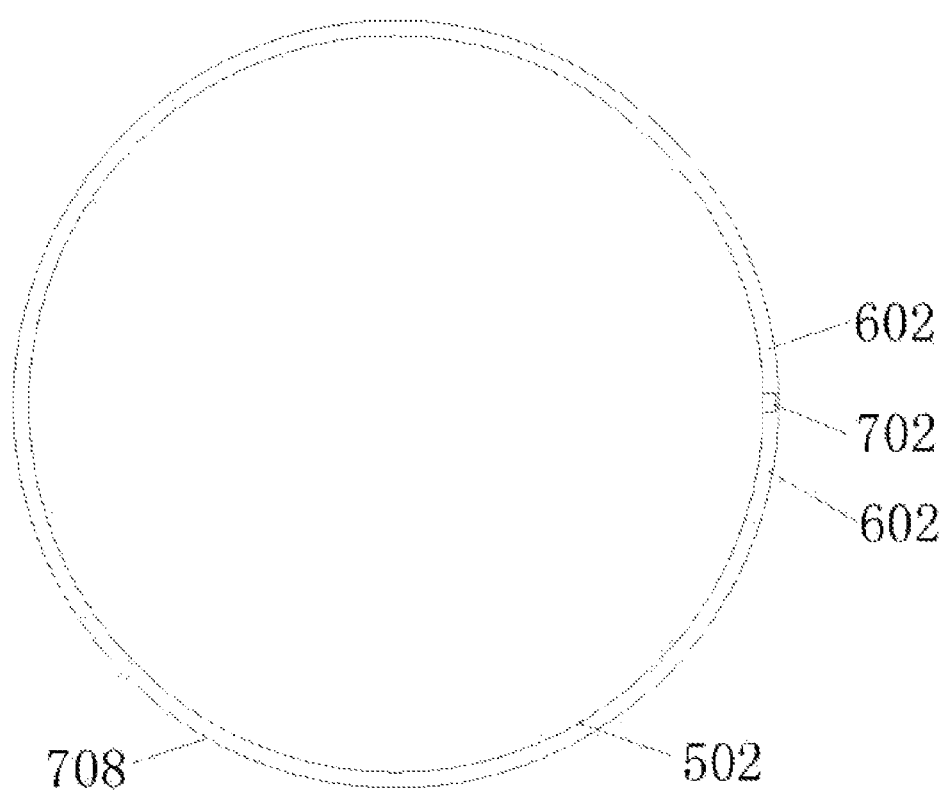
FIG. 8 is a schematic diagram of a round tubular object according to the disclosure.

In Step 308, the nick 504 is closed. In an exemplary embodiment, the nick 504 should be closed by welding. In this embodiment, the flat portion 602 of the round piece 502 is placed in a device or another device, and the first end 506 is required to be kept nearby the second end 508 to close the nick 504. The first end 506 and the second end 508 are jointed in a proper welding manner, for example, but not limited to, Melt Inert-Gas (MIG) welding, laser welding and gas metal-arc welding. FIG. 7 illustrates extension of a welding seam 702 along its width direction after closing of the closed round piece 502. As realized, welding slag may be accumulated along an edge of the welding seam 702 in a welding process. After the first end 506 and the second end 508 are welded in Step 308, the round piece 502 is machined into the round tubular object 708 (as shown in FIG. 8), is usually cylinder-shaped but is required to be further machined and processed to remove the generated welding slag and eliminate the flat portion 602.

In another embodiment of Step 308, the nick 504 is closed by resistance butt welding. In this method, the first end 506 and the second end 508 are butted together and then heated by a current to a required temperature. Before and during this process, pressure should be applied to the first end 506 and the second end 508, so that the first end 506 may be jointed to the second end 508 by the applied pressure when the round piece 502 reaches a plastic state. The welding slag on a welding joint or local deformation may make Step 310 necessary.

In Step 310, the welding slag is removed from the round tubular object 708. Any proper machining method may be adopted to remove the welding slag and prepare the round tubular object 708 for the subsequent process. In Step 310, various machining and processing technologies may be adopted, for example, grinding, sanding, polishing and finishing. The welding slag along the welding seam 702 of the round tubular object 708 and the welding slag on the edges of the welding seam 702 are removed. Necessary machining is required to be performed on the round tubular object 708 until the surface at the welding seam 702 of the round tubular object 708 is smooth and there is no defect such as blurs or bulges.

In Step 310, the flat portion 602 of the round tubular object 708 is eliminated by formation. Once the round tubular object 708 is connected into a continuous and complete shape, its cylinder shape is undoubtedly recovered. A proper roll forming machine or another machining method may be adopted to remove the flat portion 602. At the end of Step 310, the shape of the round tubular object 708 is a cylinder, as shown in FIG. 8. After this step, an external diameter of the round tubular object 708 is smaller than a final diameter of the wheel rim 102. As described, the round tubular object 708 is finally extended and formed into a final ideal dimension of the wheel rim 102.

Figure 9:
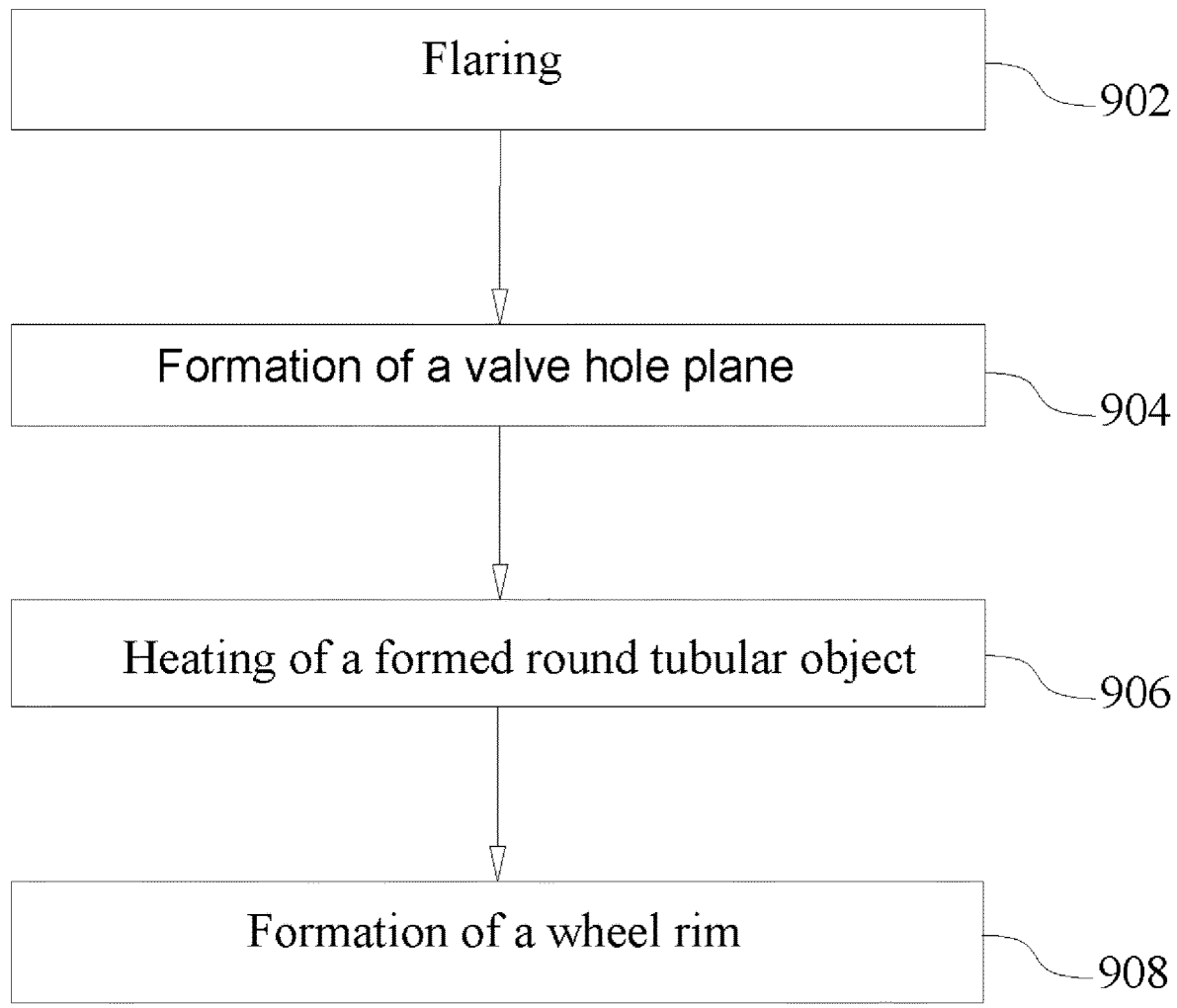
FIG. 9 is a schematic diagram of an exemplary process of forming a round tubular object wheel rim according to an embodiment of the disclosure.

After the round tubular object 708 is manufactured by the abovementioned step, the round tubular object 708 is formed into a contour used as the wheel. FIG. 9 is an exemplary method for forming the wheel rim 102. The exemplary method for forming the wheel rim 102 includes the following steps: Step 902: flaring, Step 904: formation of a valve hole plane, Step 906: heating of the formed round tubular object 708 and Step 908: formation of the wheel rim. As those of ordinary skill in the art know, other additional steps may also be used or each abovementioned step may further be separated or divided into multiple steps.

Figure 10:
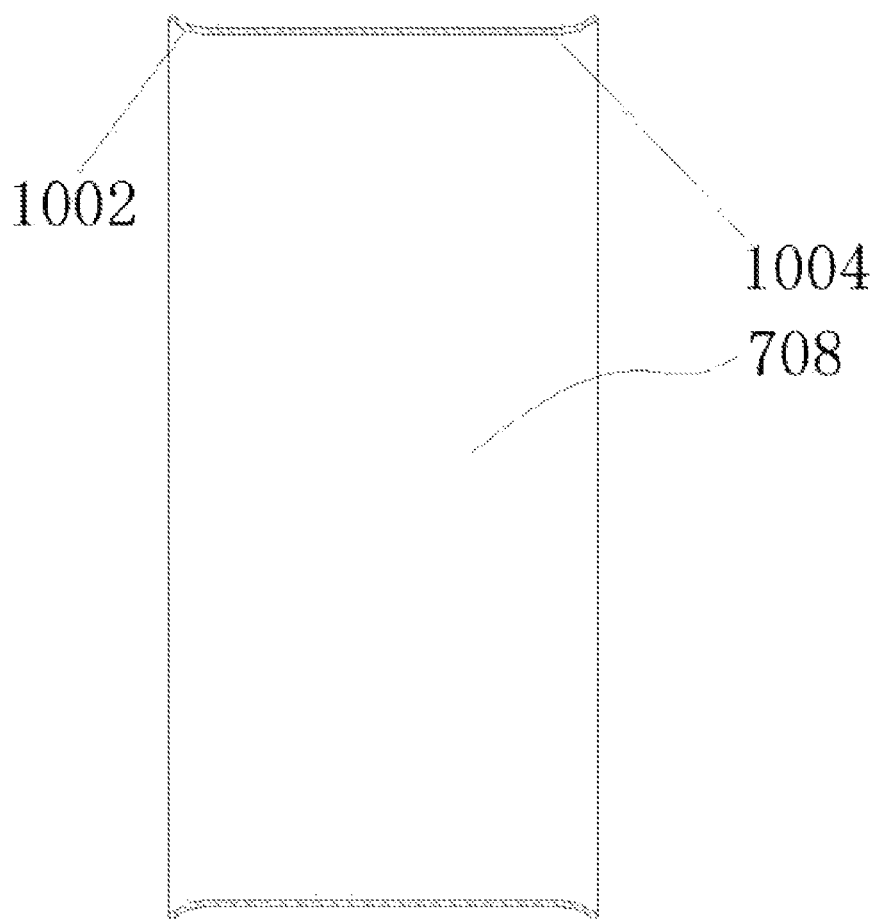
FIG. 10 is a schematic diagram of a round tubular object with flared edges according to an embodiment of the disclosure.

In Step 902, edges of the round tubular object 708 are flared. As shown in FIG. 10, the round tubular object 708 is flared to make diameters of its flared edge 1002 and flared edge 1004 larger than that of a middle portion of the round tubular object 708. Any proper flaring process may be used in Step 902. The best method is to use a press and a corresponding mold to manufacture the flared edge 1002 and the flared edge 1004. In this exemplary method, the round tubular object 708 is placed in the mold, and the flared edge 1002 and the flared edge 1004 are simultaneously formed. In another exemplary method, a roll forming machine or a flaring machine may be used. In another embodiment, the flared edge 1002 and the flared edge 1004 may be formed in two steps.

Figure 11:
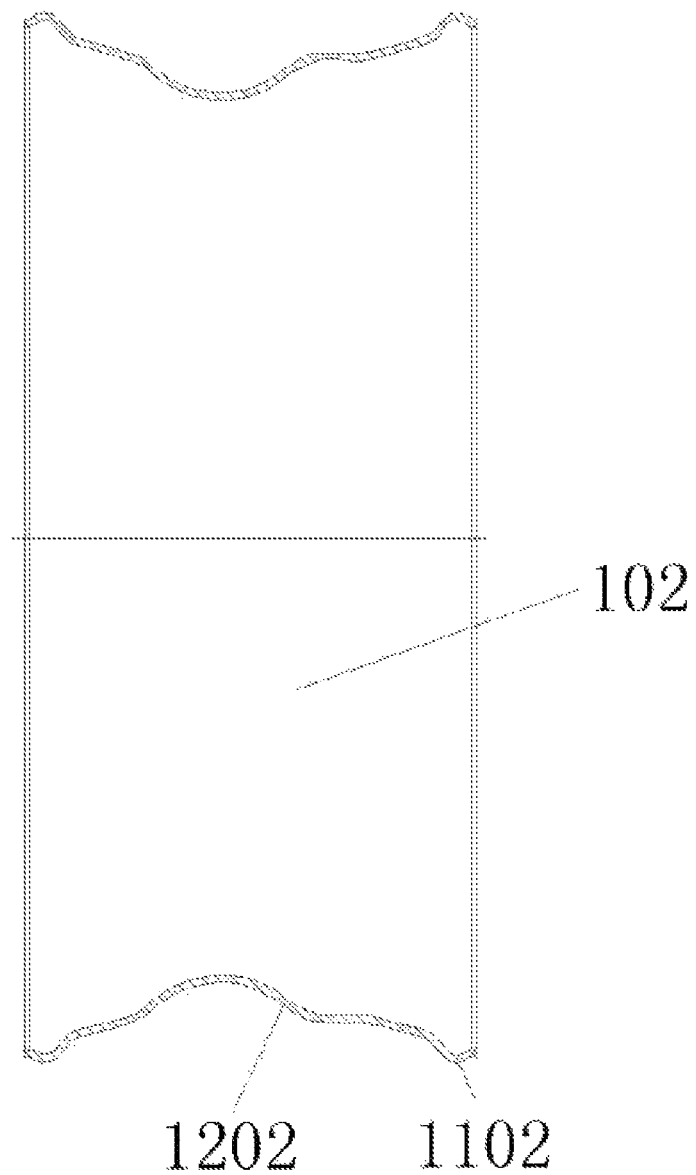
FIG. 11 is a schematic diagram of a wheel rim according to an embodiment of the disclosure.

In Step 904, the valve hole plane 1202 is formed. As shown in FIG. 11, an internal contour 1102 includes a section for subsequently machining a valve hole. When the wheel 100 is put into use and a tire is assembled on the wheel 100, the valve hole is formed to mount a valve. For manufacturing the valve hole in the subsequent process, the valve hole plane 1202 is formed along the section of the internal contour 1102. The valve hole plane 1202 is a section of the internal contour 1102. Under a normal condition, it is a plane in a local region. However, the valve hole plane 1202 is located at a bevel angle relative to an axis of the round tubular object 708.

In Step 906, a formed round tubular object 1000 is heated to a high temperature. The exact temperature changes on the basis of different structures of the formed round tubular object 1000. However, a preferred temperature at least reaches an Ac3 temperature of an alloy of the formed round tubular object 1000. In an embodiment where the boron steel is applied, the Ac3 temperature is 950° C. At a high temperature higher than the Ac3 temperature, a steel structure of the formed round tubular object 1000 is transformed into an austenite and becomes a metal part with a more uniform structure. Meanwhile, machining hardening in the previous machining process or another undesirable microstructure is eliminated. The high temperature of the formed round tubular object 1000 is required to be kept in subsequent Step 908 of forming the wheel rim. For keeping the required temperature in Step 908, the formed round tubular object 1000 is preferably transferred onto a hot forming press from a heating furnace within 12 seconds. Other time or transferring methods may also be used as long as the formed round tubular object 1000 is kept at a high temperature during forming and cooling (which will be subsequently described).

Figure 12:
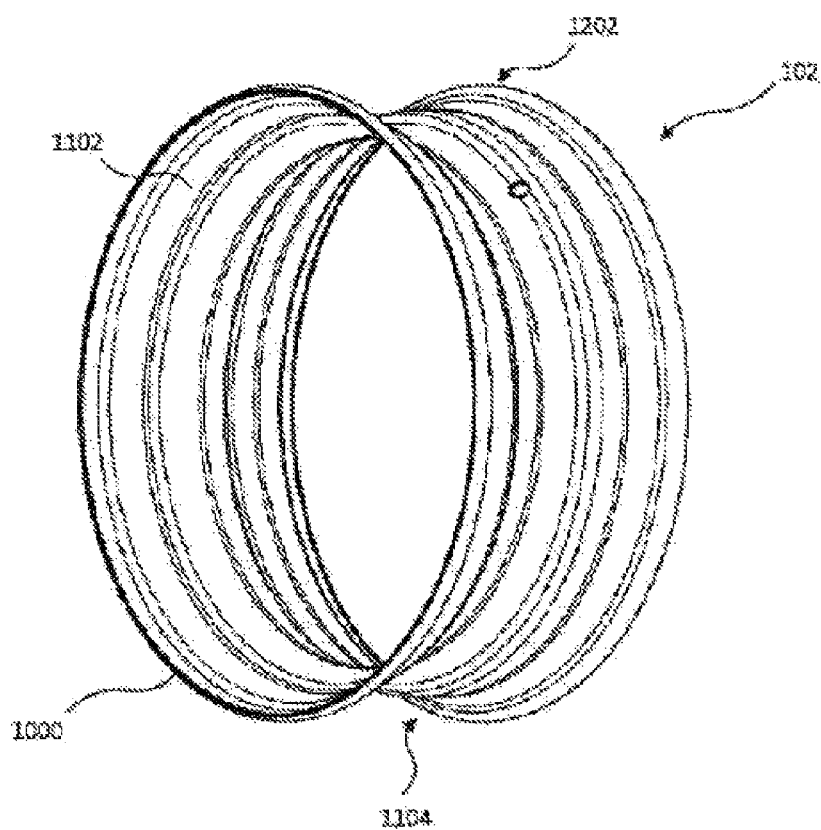
FIG. 12 is a schematic diagram of a wheel rim according to another embodiment of the disclosure.

In Step 908, the internal contour of the round tubular object 708 is formed on the hot forming press. FIG. 11 illustrates an embodiment of the internal contour 1102 of the wheel 100. As realized, various internal contours are formed according to a dimensional specification and structural requirement of the wheel 100 in Step 904. In Step 908, the internal contour of the round tubular object 708 is formed, and an external diameter of the round tubular object 708 is expanded to a final expected diameter of the wheel rim 102. By the forming process of Step 908, necessary cooling is also provided for formation of the round tubular object 708, and an ideal microstructure is given to achieve high mechanical performance. When an expansion mold is used in Step 908, one embodiment is to provide proper cooling with water or another coolant. In another embodiment, when the formed wheel rim 102 is kept on the expansion mold for expanding the diameter of the round tubular object 708, a nozzle array sprays water or the coolant onto a tire mounting lateral surface 1104 of the wheel rim 102. In this embodiment, the nozzle array may spray water or the other coolant onto the tire mounting lateral surface 1104 (shown in FIG. 12) in a crossing and overlapping manner. Overlapping application of the coolant ensures uniform phase change during a process of cooling the round tubular object 708. Non-uniform cooling or non-uniform application of the coolant may cause dimensional deformation of the wheel rim 102 or cause undesirable mechanical performance of a local region, which may cause an early failure of the wheel 100 in a using process. By use of the expansion mold and water spraying, the wheel rim 102 is rapidly cooled to about 200° C. and extracted from the expansion mold. An extraction temperature of 200° C. is conductive to diffusion of hydrogen in metal. The wheel rim 102 may be selectively tempered at 400° C., and tempering time is controlled between 20~60 minutes. The properly cooled wheel rim 102 is endowed with hardness of about 52HRC and tensile strength of about 1,300~1,500 Mpa. These mechanical properties allow use of steel thinner than a conventional steel wheel rim for manufacturing the wheel rim 102, so that the weight of the wheel 100 is obviously reduced.

The wheel rim 102 is continuously machined in Step 214 of the exemplary method, and fine machining of the formed wheel rim. In this stage, further machining and other processes are required to complete the final shape of the wheel rim 102 and add other structural features, for example, adding the valve hole. Laser cutting, punching, drilling or another proper machining manner may be adopted for the valve hole, but the laser cutting is a preferred machining manner.

Besides manufacturing of the wheel rim 102, a manufacturing process for a spoke 104 (Step 218 in FIG. 2) is also involved. An exemplary method for manufacturing the spoke 104 includes the following steps: Step 220: preparing a spoke blank, Step 222: forming the spoke blank and Step 224: fine machining of the spoke 104. For preparing the spoke 104 subsequently connected with the wheel rim 102, all of these steps further include more sub-steps and processes.

Figure 13A:
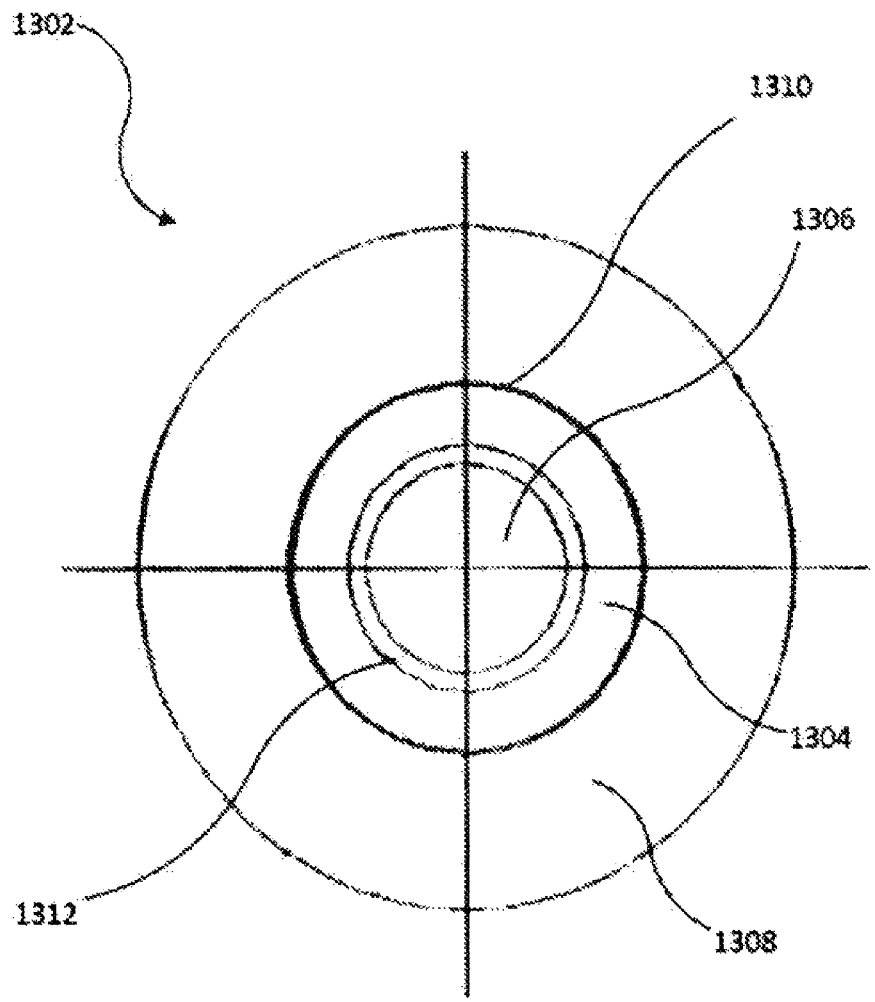
FIG. 13a is a schematic diagram of a spoke blank according to an embodiment of the disclosure.
Figure 13B:
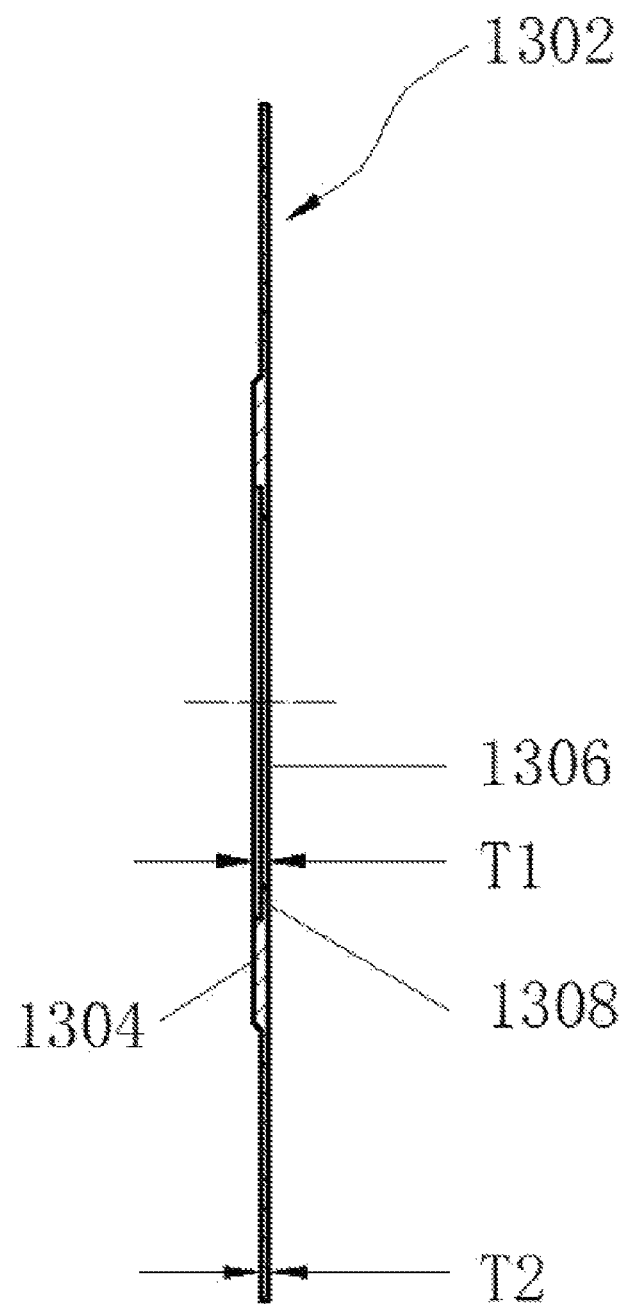

In Step 220, the spoke blank for machining is prepared. In the step, a variable section thickness spoke blank is produced. The variable section thickness spoke blank allows adoption of a thicker or stronger material for a central region, mounted on a vehicle, of the spoke 104 of the wheel 100. In the using process of the wheel 100, its central region bears a high stress, and if an improper thickness is adopted or the material is poor in performance, the wheel 100 is likely to fall before reaching expected life. Producing one wheel 100 with the spoke 104 of which the central region has a larger section thickness may overcome shortcomings of a previous design without remarkably increasing the weight of the wheel 100. As shown in FIG. 13a and FIG. 13b, a thickness of the central region of the spoke blank 1302 is T1, and a thickness of a peripheral portion radially extending outwards from a central hole 1306 is T2. In the embodiment, T1 is larger than T2. The spoke blank 1302 has a structural characteristic of variable section thickness, that is, the central region of the finally formed spoke 104 is thicker, and during mounting, the central region is connected with the vehicle. An outer side peripheral region of the spoke 104, i.e., the region connected with the wheel rim 102, is thinner. In an exemplary embodiment, the thickness T1 of the spoke blank 1302 is about 8 mm, and the thickness T2 is about 4.5 mm. In another exemplary embodiment, the spoke blank 1302 may have another thickness, which depends on a final expected dimension of the spoke 104 and material performance of the spoke 104.

Two exemplary methods of producing the variable section thickness spoke blank are disclosed in the disclosure. One exemplary method includes manufacturing of a spliced blank. The spliced blank is manufactured by concentrically positioning a reinforcing ring 1304 on a spoke substrate 1308 and then welding the reinforcing ring 1304 on the spoke substrate 1308. The embodiment where the reinforcing ring 1304 is welded on the spoke substrate 1308 includes welding along an outer side edge 1310 and an inner side edge 1312 of the reinforcing ring 1304. A welding depth of the outer side edge 1310 is the most important when the reinforcing ring 1304 is welded on the spoke substrate 1308. In the exemplary method, it is expected that the welding depth of the outer side edge 1310 may be kept within a range of 12-15 mm. If the welding depth of the outer side edge 1310 reaches the required value described above, durability of the wheel 100 may be greatly improved. If the welding depth is not enough, it is particularly likely to form fatigue cracks at a welding point. If the welding depth of the outer side edge 1310 may reach that described above, the welding point may be located at an edge of a nut connecting the wheel and the vehicle or below a nut gasket. In such a manner, a material weakened by welding machining is pressed below a nut flange or the nut gasket, so that fatigue life of the finished wheel 100 may be greatly prolonged.

Figure 14:
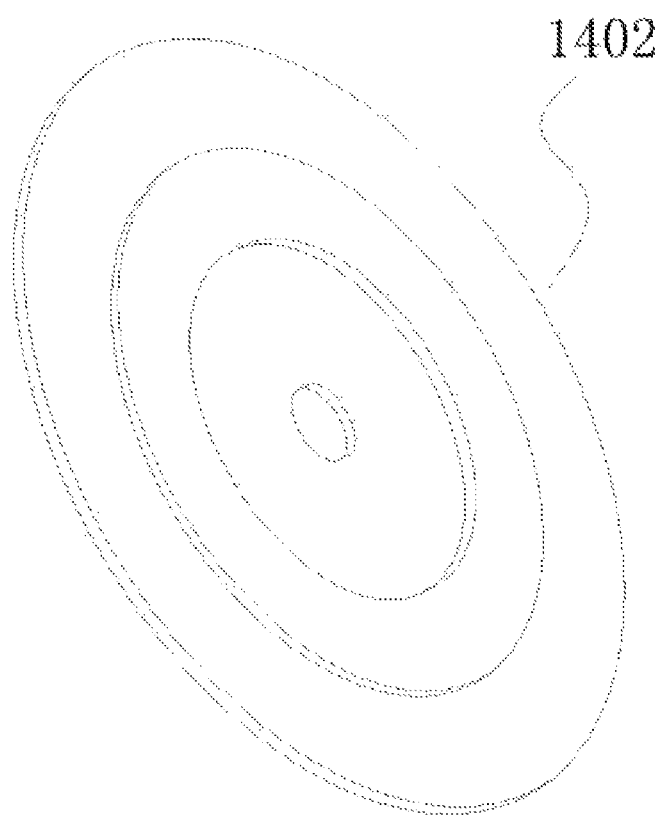
FIG. 14 is a schematic diagram of a spoke blank according to another embodiment of the disclosure.

The variable section thickness spoke blank may be obtained by manufacturing a conical variable section thickness spoke blank 1402. In an exemplary embodiment, a constant thickness spoke blank with a central hole may be rolled and formed by a hard roll forming mold to reduce the thickness of a radial outer side periphery of the spoke blank 1302. In the embodiment, a spoke substrate with a thickness of about 8-10 mm is spun and formed by the hard roll forming mold, so that an external diameter of the spoke blank 1302 is increased, and the thickness of the radial outer side periphery of the spoke blank 1302 is reduced. In the embodiment, the conical variable section thickness spoke blank 1402 is shown in FIG. 14. As understood, the conical variable section thickness spoke blank 1402 endows the spoke 104 with the advantages of relatively thick central region and relatively thin radial outer side peripheral region. These advantages include improvement of the durability and reduction of the weight. A subsequent machining process similar to that described for the spoke blank 1302 may be executed on the conical variable section thickness spoke blank 1402.

Figure 19:
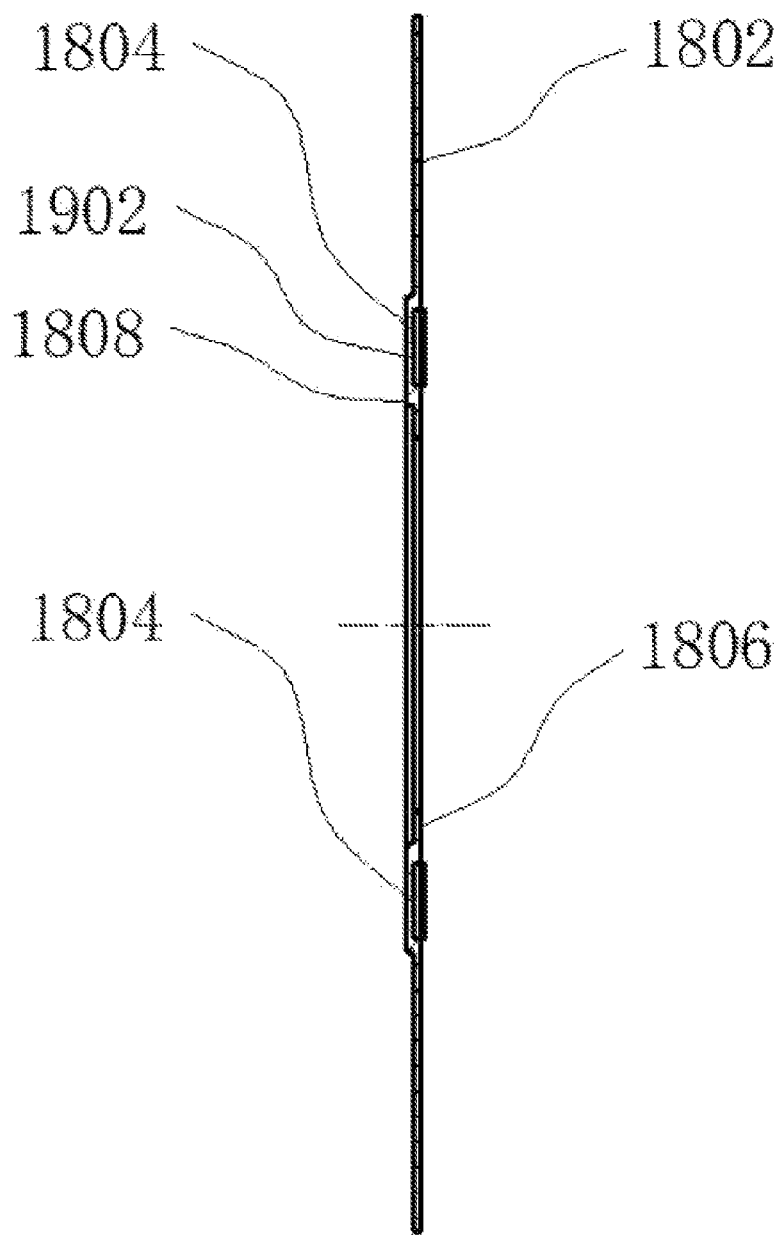
FIG. 19 is a schematic diagram of a spoke blank according to another embodiment of the disclosure.
Figure 20:
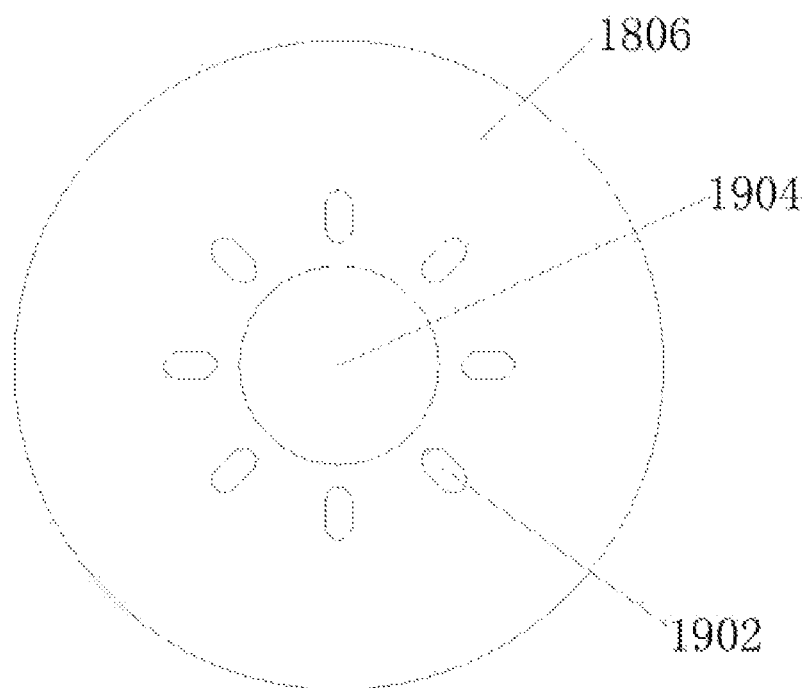
FIG. 20 is a schematic diagram of a spoke according to another embodiment of the disclosure.

Another embodiment of the wheel 100 is shown in FIG. 19. In an exemplary embodiment, a spoke blank 1802 may include an air spring cavity 1804. For forming a spring seat, grooves 1902 shown in FIG. 20 are required to be machined in a spoke substrate 1806. In the embodiment, eight grooves 1902 are uniformly spaced from each other along a central hole 1904 of the spoke substrate 1806. Each groove 1902 refers to a sunken portion in the spoke substrate 1806. When a reinforcing ring 1808 is welded or fixed on the grooves 1902 of the spoke substrate 1806, the air spring cavity 1804 is formed. The air spring cavity 1804 is formed to eliminate vibration when the wheel 100 is mounted on the vehicle for use. The layered air spring cavity 1804 may provide a variable modulus for a finished product structure to damage and/or distort any sound which may be transmitted to a brake and axle of the vehicle from the wheel. The embodiment shown in FIG. 20 illustrates eight elliptical grooves 1902. Grooves 1902 in other shapes or numbers may also be used and machined to form one or more air spring cavities 1804.

After the variable section thickness spoke blank is machined, the spoke blank 1302 is required to be further machined. The spoke blank 1302 is heated to a certain high temperature. An accurate temperature is determined according to a structure of the spoke blank 1302. However, the preferred temperature is at least an Ac3 temperature of an alloy of the spoke blank 1302. At a high temperature higher than the Ac3 temperature, a microstructure of the spoke blank 1302 is transformed into an austenite, and meanwhile, a variable section thickness spoke blank with a more uniform microstructure is formed. When the spoke blank 1302 is transferred to subsequent Step 222 of machining the spoke blank, the high temperature of the spoke blank 1302 is required to be kept. For keeping a required temperature in Step 222, time for transferring the spoke blank 1302 from the heating furnace for heating onto the hot forming press is preferably shorter than 12 seconds. Other time or transferring methods may also be used as long as the spoke blank 1302 may be kept at a high temperature during forming and cooling.

Figure 15:
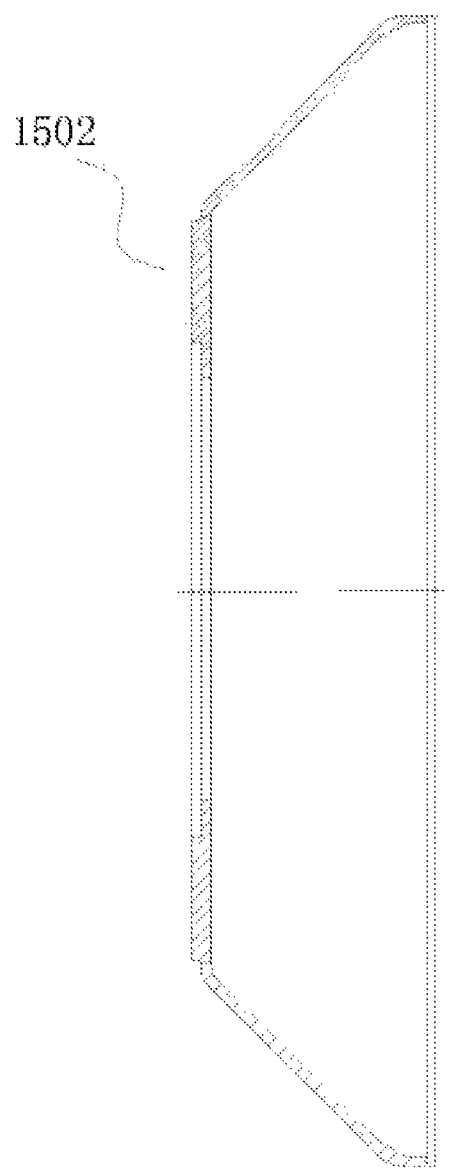
FIG. 15 is a schematic diagram of a spoke according to an embodiment of the disclosure.
Figure 16:
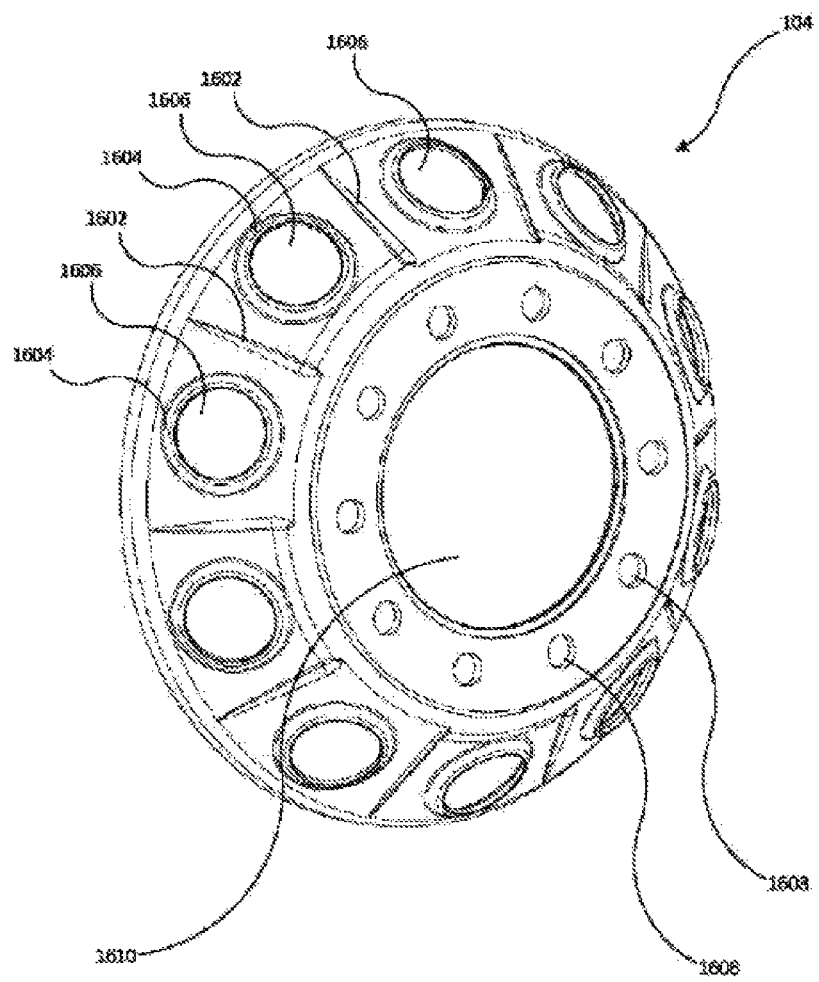
FIG. 16 is a schematic diagram of a spoke according to another embodiment of the disclosure.

In Step 222, the spoke blank 1302 is substantially machined into a recess shown in FIG. 15. The central region, with the relatively large thickness T1, of the spoke blank 1302 still keeps a planar structure after this process, and the radial outer side peripheral region of the spoke blank 1302 is machined into a recessed cross section shown in FIG. 15. Besides the recessed cross section, the spoke blank 1302 may also be machined into different contours and structures, including gussets, reinforcing ribs, raised edges or other shapes capable of improving strength, rigidity and durability of the finally assembled wheel 100. For example, section rigidity of the lightweight steel wheel mentioned in the disclosure is lower than that of the conventional steel wheel, so that the reinforcing ribs and the gussets are required for improvement of the rigidity of the spoke. FIG. 16 is an exemplary structure of a formed spoke blank with gussets 1602 and raised edges 1604. In the embodiment shown in FIG. 16, each gusset 1602 is additionally arranged between two adjacent air holes 1606, and each raised edge 1604 is machined at a corresponding air hole 1606. The raised edges 1604 are important features prolonging the life of the wheel 100. During manufacturing, microcracks may be formed at an edge of the air hole 1606. The raised edge 1604 moves a high-stress region of the finished wheel from the edge of the air hole 1606. Correspondingly, the life and durability of the wheel 100 are improved. In such a manner, the number and dimension of the air hole 1606 may also be increased to improve a ventilation effect of the brake of the vehicle mounted with the wheel 100. Relatively large air holes 1606 may also reduce the weight of the wheel 100. Other shapes and structures may also be applied to the spoke blank 1302, which depends on expected final properties and application of the wheel 100.

As mentioned above, Step 222 of forming the spoke blank 1302 is executed in the hot press under a high-temperature condition. After heating, the heated spoke blank 1302 is transferred from the heating furnace onto the hot press by use of a robot. During transferring, before or at the same time when the heated spoke blank 1302 is placed in a mold of the hot press, the temperature of the heated spoke blank 1302 is monitored by an infrared monitor. Machining at the high temperature is intended to obtain an expected microstructure of the spoke 104. After the forming process executed in the hot press, the spoke 104 is required to be properly cooled, so that the expected microstructure of the spoke 104 may be obtained, and the spoke 104 is took out at about 200° C. to limit a hydrogen embrittlement amount. In order to achieve this purpose, the mold in the hot press may provide a cooling function, and the cooling function is configured to keep a proper temperature of the mold, so that a cooling speed of the mold in the hot press may be controlled to further realize the expected microstructure. Another method for obtaining this result is operation over unit pressure of the mold. Relatively high unit pressure may achieve a higher cooling speed. Splitting the mold or endowing the hot press with a capability of providing different local pressure makes the unit pressure controllable, thereby providing a proper and advantageous cooling amount during machining. For facilitating the process, the mold may be provided with a temperature monitoring assembly, so that the mold may be kept in a closed state until the formed spoke blank is cooled to a proper temperature. In the embodiment, an opening temperature of the mold is 200° C. After the spoke blank 1302 is formed, the formed spoke blank is finely machined into the spoke 104 in Step 224.

In Step 224, the formed spoke blank 1502 is required to be further machined into various openings and holes shown in FIG. 16. As mentioned above, the spoke 104 may include the air holes 1606 and bolt holes 1608. In Step 224, a central through hole 1610 is further machined into a final dimension. Various holes may be machined by various proper methods, but laser cutting is the preferred method. Laser cutting of the air holes 1606, the bolt holes 1608 and the central through hole 1610 may improve the durability and fatigue life of the wheel 100 because various holes machined by other methods such as stamping may form microcracks and the microcracks may extend to cause an early failure of the wheel.

Figure 17:
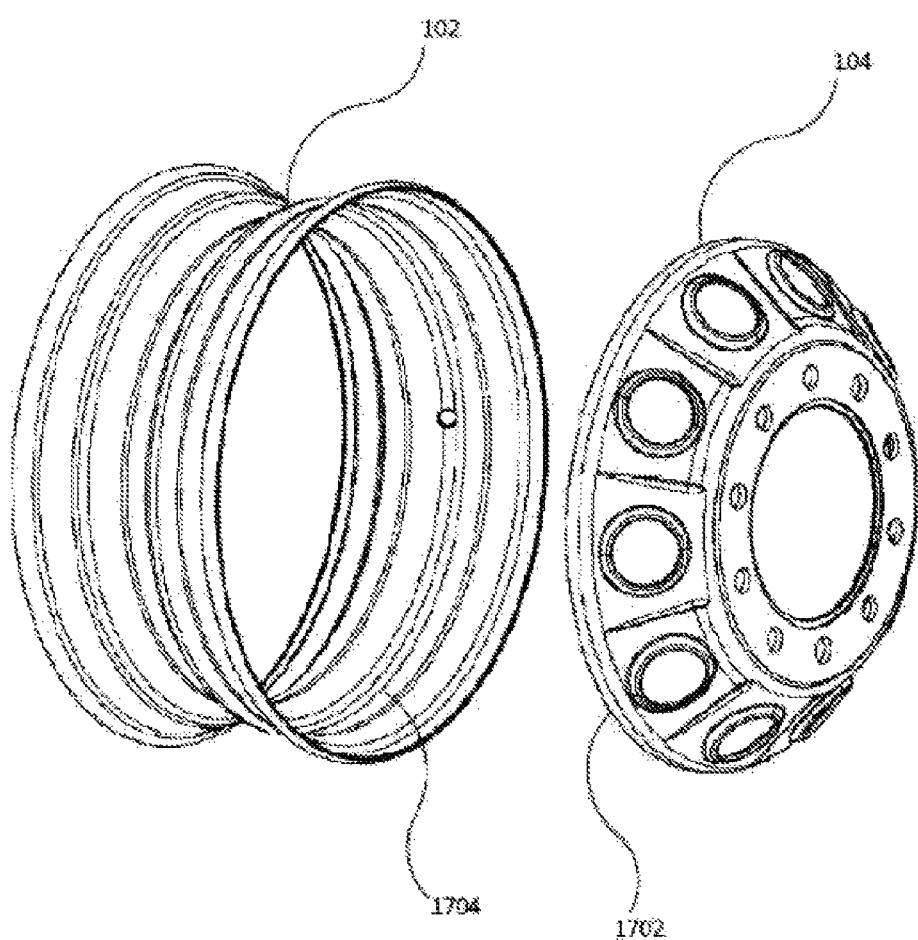
FIG. 17 is a schematic diagram of a wheel according to an embodiment of the disclosure, and the schematic diagram is an exploded view of a wheel of the wheel and a spoke of the wheel.

After the wheel rim 102 and the spoke 104 are manufactured, the wheel rim 102 and the spoke 104 are assembled in Step 228. In Step 228, the wheel rim 102 shown in FIG. 17 is positioned on a radial outer wall 1702 of the spoke 104. The radial outer wall 1702 is positioned close to an inner welding surface 1704 of the wheel rim 102. In an exemplary embodiment, an external diameter of the spoke 104 should be slightly larger than a diameter of the inner welding surface 1704, so that the spoke 104 and the wheel rim 102 may form interference fit. Interference between the external diameter of the radial outer wall 1702 and the inner welding surface 1704 is between 0.5 mm and 2.5 mm, which provides high-quality welding for a connecting part. Excessively large interference may deform a dimension of the spoke 104 or make it difficult to assemble the spoke 104 in the wheel rim 102. On the other hand, excessively small interference may cause defective welding and further cause the early failure of the wheel.

Figure 18:
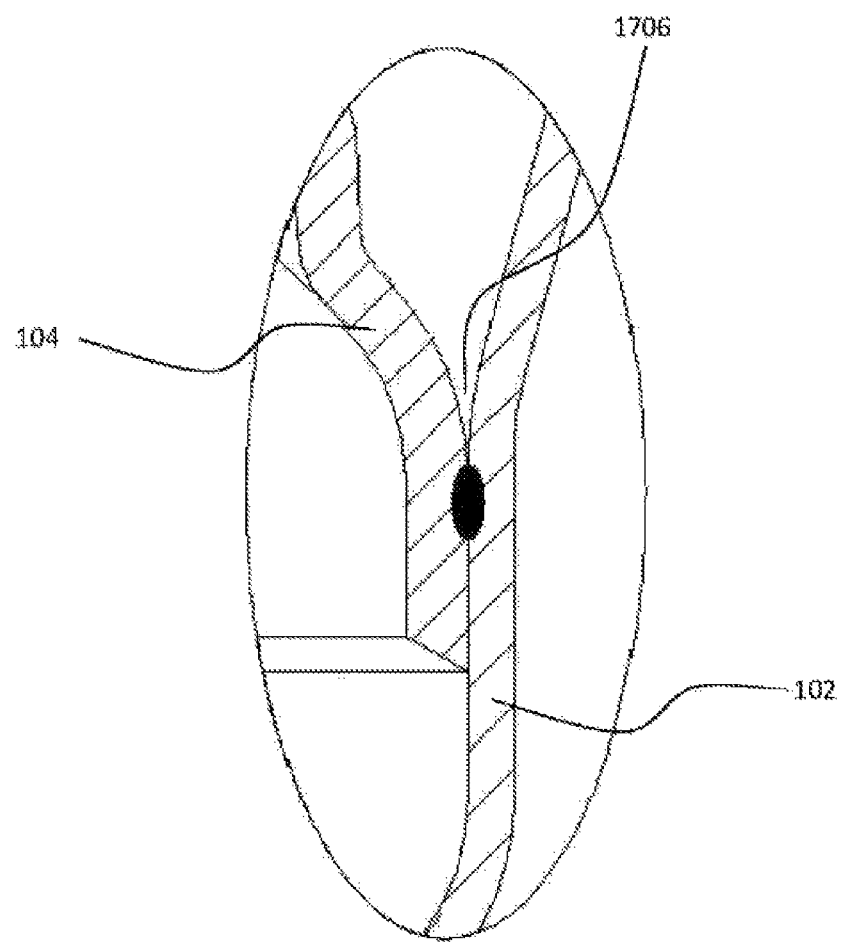
FIG. 18 is a schematic diagram of combination and welding of a wheel according to an embodiment of the disclosure.

After the spoke 104 is positioned on an inner side of the wheel rim 102, the two parts are connected together by welding. Laser welding is an exemplary welding manner because this welding manner may reduce adverse impact caused by substrate heating. Other welding processes may also be used, for example, MIG welding. However, MIG welding may bring undesirable properties to a heat affecting region of material because of heating. Unnecessary heating may bring adverse impact to dimensional accuracy and may also cause the early failure of the wheel 100. In an exemplary embodiment, as shown in FIG. 18, laser welding is adopted for a groove 1706 in a raised side of the spoke 104, and a welding region is about 1 mm to 2 mm.

After the wheel 100 is manufactured, some other post machining may be performed in Step 236. Post machining may include cleaning, electrophoresis, painting and testing/certification of a finished wheel. By such post processes, corrosion resistance of the finished wheel may be achieved and its mechanical performance may be affected. In an exemplary post processing embodiment, a surface of the wheel is painted with a primer and a finish paint in an electrostatic or other manner, and the primer and the finish paint are cured in the heating furnace to achieve sufficient corrosion resistance.

In another exemplary post processing embodiment, the wheel 100 is cleaned by acid washing (after machining and before painting). Many abovementioned processes for machining metal parts of the wheel 100 may cause discoloration or produce oxide scales on surfaces of the metal parts. For prolonging the life of the wheel 100 or improving machining of metal assemblies, the oxide scales should be eliminated. Acids are usually adopted to remove these pollutants in an acid washing process. The acids frequently adopted in the acid washing process are hydrochloric acids. However, the acids are inapplicable to a wheel machining process because such acids may cause hydrogen embrittlement phenomena. Therefore, in the manufacturing process of the wheel 100, organic acids are preferred. For example, a citric acid in the organic acids may be adopted to remove oxides, impurities or other pollutants which may exist on the metal parts of the wheel 100. In an exemplary method, the wheel 100 is impregnated in a certain amount of organic acid for a sufficient time to remove undesired pollutants.

The abovementioned acid washing process may be adopted in a final machining process or may be adopted in different stages of the manufacturing process. For example, organic acid washing may be performed on all of the wheel rim substrate 402, the spoke blank 1302 or the reinforcing ring 1304 before the abovementioned manufacturing method. Similarly, welding connecting surfaces are also sensitive to pollutants. Acid washing may also be performed on the parts, i.e., the wheel rim 102 and the spoke 104, welded together, of the wheel 100 to reduce a probability of a welding failure.

From the above description, the wheel 100 has advantages of weight smaller than that of the conventional steel wheel, higher dimensional accuracy and enough durability and service life. It is to be understood that it is easy for those skilled in the art to make various variations and modifications to the preferred examples disclosed in the disclosure. Such variations and modifications may be made without departing from the spirit and scope of the disclosure and reducing the expected advantages thereof. Therefore, these variations and modifications shall be included in the appended claims.

Various embodiments are described in the disclosure. Those skilled in the art should know that more embodiments and implementation modes within the scope of the disclosure are all possible. Therefore, the disclosure is not limited to the appended claims and equivalents thereof.

It is to be noted that terms used herein are only adopted to describe specific implementation modes and not intended to limit the exemplary implementation modes according to the application. For example, singular forms, used herein, are also intended to include plural forms, unless otherwise clearly pointed out. In addition, it is also to be understood that terms "contain" and/or "include" used in the specification refer/refers to existence of features, steps, operations, apparatuses, components and/or combinations thereof.

Unless otherwise specified, relative arrangements of components and steps elaborated in these embodiments, numeric expressions and numeric values do not limit the scope of the disclosure. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discus the certain item in the subsequent drawings.

In the descriptions of the disclosure, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the disclosure and to simplify the descriptions without indicating or impliedly indicating that the referring device or an element must have a specific location and must be constructed and operated with the specific location, and accordingly it cannot be understood as limitations to the disclosure. The nouns of locality "inner and outer" refer to the inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

In addition, it is to be noted that terms "first", "second" and the like are used to limit parts, and are only intended to distinguish corresponding parts. If there are no otherwise statements, the above terms do not have special meanings, such that they cannot be understood as limits to the scope of protection of the disclosure.

It is to be noted that terms used herein are only adopted to describe the specific implementation modes and not intended to limit the exemplary implementation modes according to the application. For example, singular forms, used herein, are also intended to include plural forms, unless otherwise clearly pointed out. In addition, it is also to be understood that terms "contain" and/or "include" used in the specification refer/refers to existence of features, steps, operations, apparatuses, components and/or combinations thereof.

It is to be noted that terms "first", "second" and the like in the specification, claims and drawings of the application are adopted not to describe a specific sequence or order but to distinguish similar objects. It is to be understood that data used like this may be exchanged under a proper condition for implementation of the implementation modes, described herein, of the application in sequences besides those shown or described here.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A method for manufacturing a wheel rim of a steel wheel, comprising:
   Step 1: heating a round tubular object in a heating furnace;
   Step 2: transferring the heated round tubular object onto a hot press, a temperature of the heated round tubular object transferred onto the hot press being higher than a required temperature, and the required temperature being at least 950° C.;
   Step 3: machining an internal contour of the round tubular object by use of a mold of the hot press to form the wheel rim; and
   Step 4: while keeping the wheel rim in the mold of the hot press, cooling the wheel rim by use of a water sprayer in the hot press, wherein the water sprayer comprises a nozzle array, and the nozzle array sprays water onto a tire mounting surface of the wheel rim in an overlapping and crossing manner, such that the wheel rim is cooled to about 200° C. and then extracted from the mold of the hot press, the extracted wheel rim then is tempered at 400° C., wherein tempering time is between 20-60 minutes.

2. The method for manufacturing the wheel rim of the steel wheel as claimed in claim 1, wherein time for transferring the heated round tubular object from the heating furnace onto the hot press is not allowed to exceed 12 seconds.

3. The method for manufacturing the wheel rim of the steel wheel as claimed in claim 1, further comprising placing the wheel rim in an acid washing tank adopting an organic acid to remove pollutants on the wheel rim.

\* \* \* \* \*